(12) United States Patent
Fan et al.

(10) Patent No.: US 10,459,109 B2
(45) Date of Patent: Oct. 29, 2019

(54) MULTI-FREQUENCY FOCUSING ACQUISITION AND PROCESSING IN WELLBORE LOGGING

(71) Applicant: Halliburton Energy Services, Inc., Houston, TX (US)

(72) Inventors: Yijing Fan, Singapore (SG); Glenn Andrew Wilson, Singapore (SG); Li Pan, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 84 days.

(21) Appl. No.: 15/755,457

(22) PCT Filed: Dec. 16, 2015

(86) PCT No.: PCT/US2015/066090
§ 371 (c)(1),
(2) Date: Feb. 26, 2018

(87) PCT Pub. No.: WO2017/105436
PCT Pub. Date: Jun. 22, 2017

(65) Prior Publication Data
US 2018/0246246 A1  Aug. 30, 2018

(51) Int. Cl.
*G01V 3/28* (2006.01)
*G01V 3/18* (2006.01)
(Continued)

(52) U.S. Cl.
CPC ............. *G01V 3/28* (2013.01); *G01V 1/306* (2013.01); *G01V 1/50* (2013.01); *G01V 3/083* (2013.01);
(Continued)

(58) Field of Classification Search
CPC . G01V 3/28; G01V 3/34; G01V 1/306; G01V 1/50; G01V 3/083; G01V 3/30;
(Continued)

(56) References Cited

U.S. PATENT DOCUMENTS 4,729,066 A    3/1988  Nelson et al.
4,965,522 A   10/1990  Hazen et al.
(Continued)

FOREIGN PATENT DOCUMENTS

WO    2005117326 A2    12/2005

OTHER PUBLICATIONS

International Search Report and Written Opinion dated Aug. 19, 2016; International PCT Application No. PCT/US2015/066090.
(Continued)

*Primary Examiner* — Amy He
(74) *Attorney, Agent, or Firm* — McGuireWoods LLP

(57) ABSTRACT

The disclosed embodiments include systems and methods for multi-frequency focusing signal processing in wellbore logging. In one embodiment, the method includes obtaining a harmonic frequency set to evaluate a resistivity of a formation at a wellbore location, where the harmonic frequency set includes at least one harmonic frequency of a fundamental frequency. The method also includes selecting a waveform from a library of waveforms based on the obtained harmonic frequency set, where the library of waveforms includes a plurality of waveforms having different frequency spectrums. The selected waveform corresponds to a predicted conductivity of the formation. The method further includes generating, based on the selected waveform, a binary waveform for use in evaluating the resistivity of the formation at the wellbore location.

20 Claims, 6 Drawing Sheets

(51) Int. Cl.
*G01V 3/26* (2006.01)
*G01V 1/30* (2006.01)
*G01V 1/50* (2006.01)
*G01V 3/08* (2006.01)
*G01V 3/30* (2006.01)
*G01V 3/34* (2006.01)
*G01V 1/04* (2006.01)
*G01V 3/12* (2006.01)

(52) U.S. Cl.
CPC ............... *G01V 3/18* (2013.01); *G01V 3/26* (2013.01); *G01V 3/30* (2013.01); *G01V 3/34* (2013.01); *G01V 1/04* (2013.01); *G01V 3/12* (2013.01)

(58) Field of Classification Search
CPC ... G01V 3/18; G01V 3/26; G01V 1/04; G01V 3/12
See application file for complete search history.

(56) References Cited

U.S. PATENT DOCUMENTS

| | | |
|---|---|---|
| 5,452,761 A | 9/1995 | Beard et al. |
| 5,841,281 A * | 11/1998 | Beard ................... G01V 3/28 324/339 |
| 2004/0090234 A1 | 5/2004 | Macume |
| 2009/0134877 A1 | 5/2009 | Schaug-Pettersen |
| 2011/0087435 A1 | 4/2011 | Hornbostel |
| 2014/0269165 A1 | 9/2014 | Froelich et al. |

OTHER PUBLICATIONS

Myer, David, Steven Constable, and Kerry Key. "Broad-band waveforms and robust processing for marine CSEM surveys." Geophysical Journal International 184.2 (2011): 689-698.

Tabarovsky, L. A., M. I. Epov, and M. B. Rabinovich. "Measuring formation anisotropy using multifrequency processing of transverse induction measurements." SPE Annual Technical Conference and Exhibition. Society of Petroleum Engineers, 2001.

Constable, S., and C. S. Cox. "Marine controlled-source electromagnetic sounding: 2. The PEGASUS experiment." Journal of Geophysical Research: Solid Earth 101.B3 (1996): 5519-5530.

Mittet, Rune, and Tor Schaug-Pettersen. "Shaping optimal transmitter waveforms for marine CSEM surveys." Geophysics 73.3 (2008): F97-F104.

* cited by examiner

MULTI-FREQUENCY FOCUSING ACQUISITION AND PROCESSING IN WELLBORE LOGGING

FIELD

The present disclosure relates generally to systems and methods for multi-frequency focusing acquisition and processing in wellbore logging.

BACKGROUND

Wireline logging is used to obtain a continuous record of petrophysical properties of a formation, such as, but not limited to, resistivity, anisotropy, dip angle of bed, radioactivity, density, porosity, acoustic properties, and pressure properties. In wireline logging, a logging tool is attached to a wireline and is lowered into a well borehole. The logging tool contains various sensor components used to obtain information relating to the formation's properties.

Electromagnetic induction logging is a technique that is sometimes used in wireline logging. In induction logging, electromagnetic induction tools are used to determine resistivity or conductivity of a formation surrounding a wellbore. Electromagnetic induction logging tools typically include at least one transmitting coil and at least one receiving coil. An alternating current having at least one frequency is conducted through the at least one transmitting coil. The alternating current induces eddy currents to flow within surrounding geological formations. The eddy current in turn induces voltages in the at least one receiving coil. The voltages induced in the at least one receiving coil are converted to apparent conductivities through a linear relationship that is based on an assumption that conductivity of the formation is insignificant. When the formation conductivity value is not insignificant, however, the voltages induced in the at least one receiver coil relate non-linearly to the formation conductivity. The difference between the derived linear relationship and the actual nonlinear formation conductivity is referred to as "skin effect." The skin effect makes the apparent conductivity value smaller than its true value and causes non-linearity of the measured values. Transverse measurements at the borehole may also be strongly affected by distortions resulting from changes in the diameter of the borehole or by variances in the thickness of an invaded zone proximate the wellbore. Resistivity measurements may be less reliable due to the foregoing conditions.

BRIEF DESCRIPTION OF THE DRAWINGS

Illustrative embodiments of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different embodiments may be implemented.

DETAILED DESCRIPTION

The present disclosure relates to multi-frequency focusing (MFF) signal processing systems for measuring a resistivity of a formation and methods to generate a waveform for the MFF signal processing system to measure the resistivity of the formation. The disclosed systems and methods are typically deployed in a wireline logging environment, by an induction logging tool.

MFF systems transmit multiple frequencies from transmitters to induce current in a formation. Typically, the MFF component of an induction logging tool also receives magnetic fields of a formation at different harmonic frequencies of a fundamental frequency and calculates the resistivity of the formation based on the received magnetic fields at the different harmonic frequencies. The MFF component may accurately determine resistivity of the formation even under adverse logging conditions, such as high conductivity, uneven wellbore diameter, and invaded zone thickness.

In one embodiment, the number of harmonic frequencies used by the MFF component varies based on formation type and is proportional to formation conductivity. For example, two harmonic frequencies of a fundamental frequency may be needed to calculate resistivity a formation consisting resistive mud, whereas, ten harmonic frequencies of the fundamental frequency may be needed to calculate resistivity of a formation consisting conductive mud. In order for the MFF component to accurately calculate resistivity of highly conductive formations, peak amplitude and signal to noise ratio (SNR) at high harmonic frequencies may not significantly deteriorate relative to the peak amplitude and SNR at low harmonic frequencies.

System and methods described herein provide a MFF signal processing system that is configured to accurately calculate the formation resistivity of various types of formations ranging from highly resistive formations to highly conductive formations.

Figure 1:
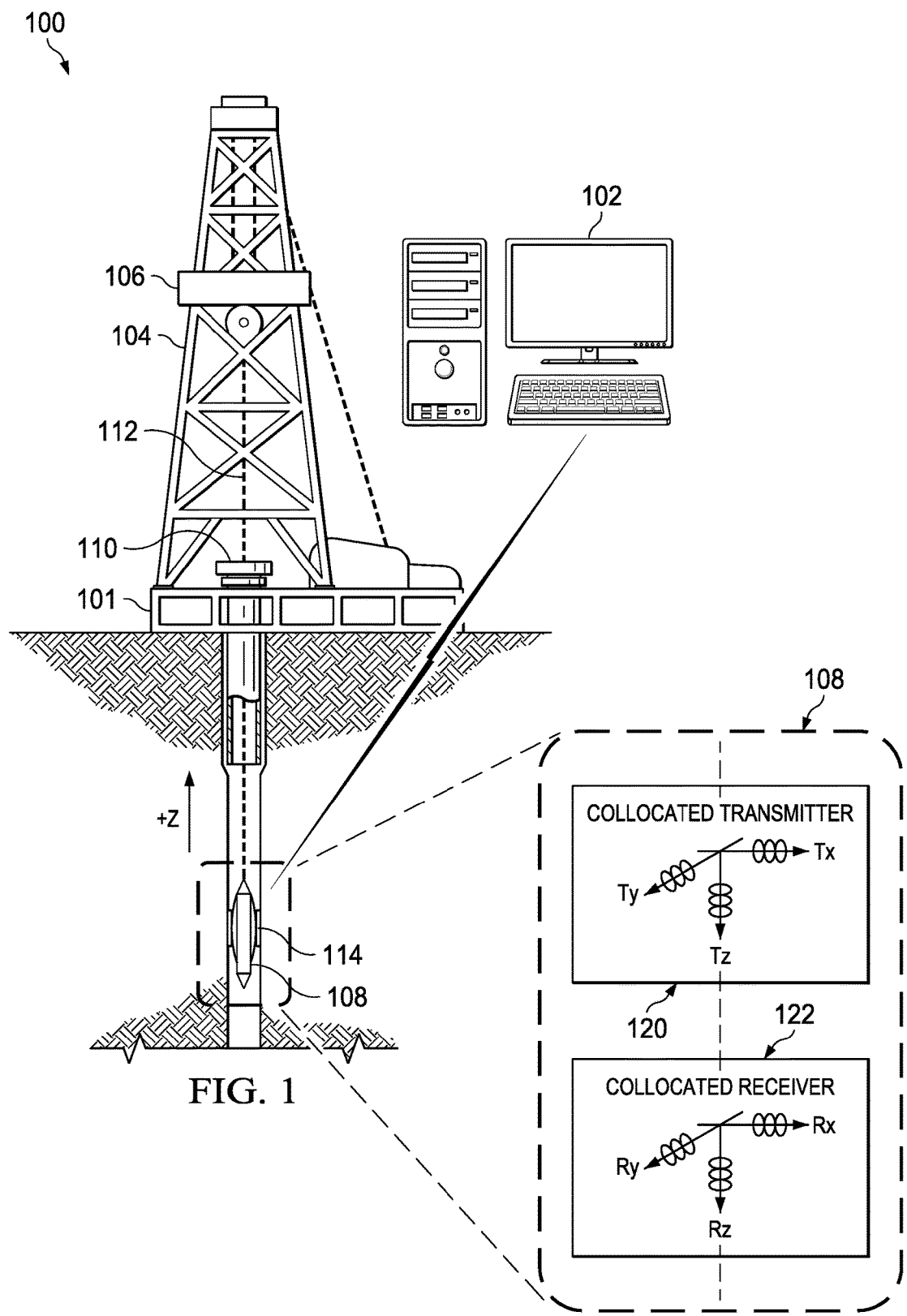
FIG. 1 is a schematic, side view of a wireline logging environment that includes an electronic system communicatively connected to an induction logging tool located in a wellbore.

Turning now to the figures, FIG. 1 shows a wireline logging environment 100 that includes an electronic system communicatively connected to an induction logging tool (logging tool) 108 located in a wellbore. In FIG. 1, a drilling platform 101 supports a derrick 104 having a traveling block 106 for raising and lowering a wireline logging tool 108 that is lowered through the wellhead 110. Once the drill string has been removed, logging operations can be conducted using the wireline logging tool 108. The wireline logging tool 108 may be a sensing instrument suspended by a cable 112 having conductors for transporting power to the logging tool 108 and telemetry from the logging tool 108 to the surface.

A logging portion of the logging tool 108 may have pads 114 that slide along the borehole wall as the logging tool 108 is pulled uphole. At the surface, a logging facility collects measurements from the logging tool 108. The logging facility includes electronic systems, such as a controller 102, for processing and storing the measurements gathered by the logging tool 108. The controller 102 is communicatively connected to the logging tool 108. Various communication modes between the controller 102 and the logging tool 108 as well as various types of electronic systems are discussed in the paragraphs below and are illustrated in the subsequent figures. Although FIG. 1 illustrates the controller 102 as a desktop computer, the controller 102 may include any electronic system operable to communicatively connect to the logging tool 108 and having hardware and software configured to, among other operations, generate a waveform for MFF processing. Additional examples of controllers include, but are not limited to, laptop computers, tablet computers, PDAs, tablet computers, smartphones, etc.

In some embodiments, a user interacts with the controller 102 to input a harmonic frequency set, which includes at least one harmonic frequency, to evaluate resistivity of a formation at the location of the logging tool 108. A library of waveforms, each having a different frequency spectrum is stored on the controller 102. The controller 102 is configured to select, based on the inputted harmonic frequency set, a waveform suitable for generating a signal to evaluate the resistivity of the formation at the location of the logging tool 108. The controller 102 is further configured to generate, based on the selected waveform, a binary waveform, where the generated binary waveform is used by the logging tool 108 to generate a signal used to evaluate the resistivity of the formation at the location of the logging tool 108. Signals corresponding to the generated waveform are then transmitted from the controller 102 to a transmitter unit 120 of the logging tool 108 via one of various communication modes discussed in detail in the paragraphs below. The transmitter unit 120 includes transmitter coils, which are used to transmit the binary waveform to induce current in the surrounding formation. The induced current induces secondary magnetic fields, which are received by receiver coils of a receiver unit 122 of the logging tool 108 and analyzed to determine resistivity.

In some embodiments, the logging tool 108 includes at least one band pass filter component that is configured to filter signals received by the receiver coils that correspond to the binary waveform for the inputted harmonic frequency. In one of such embodiments, at least one quadrature detection band pass digital filter operates to filter the received binary waveform for magnetic field components at each harmonic frequency of the inputted harmonic frequency set. In some embodiments, received signals corresponding to the filtered harmonic frequencies are calibrated by a calibration factor $$K = \frac{8\pi L}{\omega \mu_0}$$

to determine apparent conductivities $\sigma$ by $\sigma = K \cdot \text{Im}[H]$, where L is the spacing between transmitter coil and receiver coil, $\omega$ is the radial harmonic frequency, and Im[H] is the imaginary part of the H-field component. The calibration is conducted for each harmonic frequency of the filtered harmonic frequencies and is provided to a MFF component of the logging tool 108 for MFF processing to calculate the resistivity of the formation at the location of the logging tool 108. The MFF processing is discussed in more detail in the paragraphs below. The MFF component may store the calculated resistivity of the formation and/or transmit the calculated resistivity of the formation to the controller 102. In other embodiments, the at least one band pass filter component and the MFF component are components of the controller 102.

Figure 2:
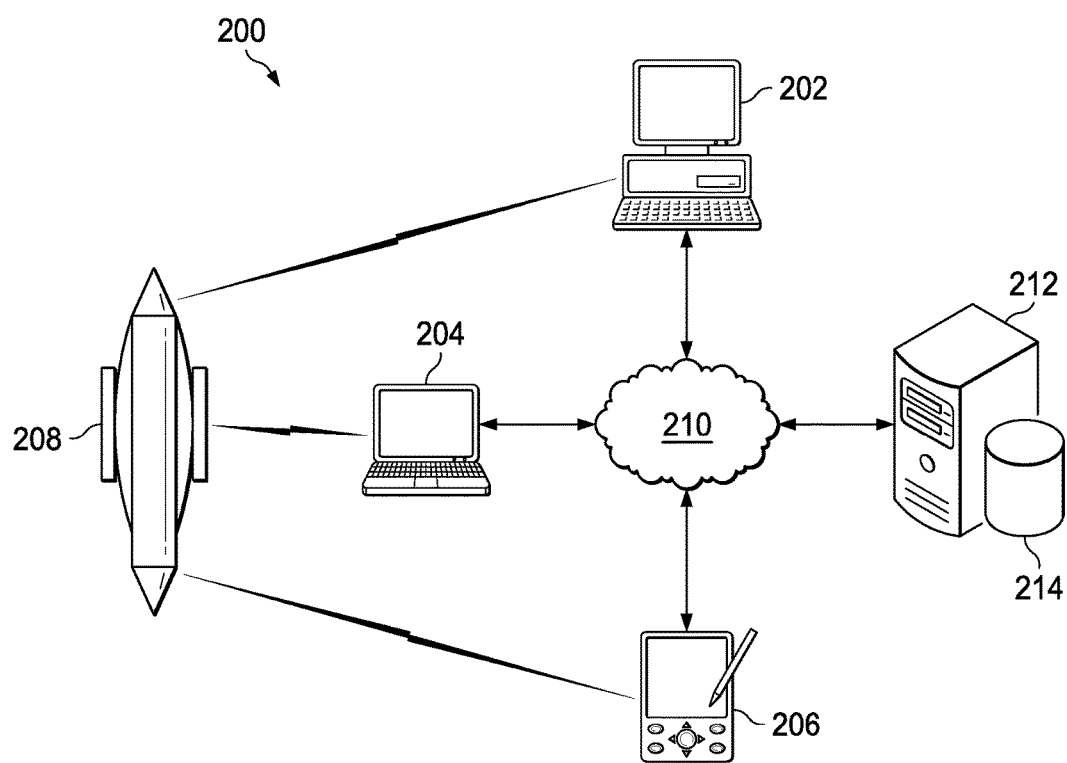
FIG. 2 shows a network environment for generating a waveform for multi-frequency focusing signal processing.

FIG. 2 shows a network environment 200 for generating a waveform for MFF signal processing. The network environment 200 includes controllers 202, 204, and 206 communicatively connected to a logging tool 208 located in a wellbore, such as the wellbore illustrated in FIG. 1. In some embodiments, each of the controllers 202, 204, and 206 includes a component (e.g., a transceiver) configured to transmit data, such as signals corresponding to a generated binary waveform, to the logging tool 208. Correspondingly, the logging tool 208 includes a component (e.g., a transceiver) configured to receive the signals corresponding to the generated binary waveform.

Similar to the controller 102 of FIG. 1, each of the controllers 202, 204, and 206 may include electronics operable to communicatively connect to the logging tool 108. Similarly, each of the controllers 202, 204, and 206 may have hardware and software configured to access a library of waveforms stored therein, and to (a) select, based on an inputted harmonic frequency set, a waveform suitable for generating a signal to evaluate the resistivity of the formation at the location of the logging tool 208, and (b) to generate a waveform for MFF processing. Each of the controllers 202, 204, and 206 may also be configured to receive, from another controller or electronic system, an input for a harmonic frequency set for generating a signal to evaluate resistivity of the formation at the location of the logging tool 208.

In some embodiments, the logging tool 208, and the controllers 202, 204, and 206 include telemeter components configured to transmit and/or to receive signals corresponding to the binary waveform and the calculated formation resistivity. The telemeter components may be hard-wired, wireless, analog, or digital. Further communication protocols, such as, Bluetooth, Wi-Fi, WiMax, and NFC may be implemented by the controllers 202, 204, and 206 to facilitate peer-to-peer or networked communication with the logging tool 208.

The controllers 202, 204, and 206 are communicatively connected to a server 212 by a network 210. The server 212 includes a data store 214. The server 212 may represent more than one computing device working together to perform the actions of a server computer. In the embodiment illustrated in FIG. 2, the data store 214 includes a library of waveforms having different frequency spectrums accessible by the controllers 202, 204, and 206 via the network 210. The data store 214 may also contain logs of measurements, such as formation resistivity, calculated by the logging tool 208.

In some embodiments, the server 212 is also configured to generate a waveform for MFF processing. In some embodiments, the server 212, upon receipt of an inputted harmonic frequency set from one of the controllers 202, 204, or 206, (a) accesses the library of waveforms stored therein, (b) selects, based on the inputted harmonic frequency set, a waveform suitable for generating a signal for evaluating the resistivity of the formation at the location of the logging tool 208, and (c) generates a binary waveform for transmission to the logging tool 208 via the network 210 and one of the controllers 202, 204, or 206.

The network 210 can include, for example, any one or more of a cellular network, a satellite network, a personal area network (PAN), a local area network (LAN), a wide area network (WAN), a broadband network (BBN), the Internet, and the like. Further, the network 210 can include, but is not limited to, any one or more of the following network topologies, including a bus network, a star network, a ring network, a mesh network, a star-bus network, tree or hierarchical network, and the like. In some embodiments, the logging tool 208 communicates with each of the controllers 202, 204, and 206 via the network 210. In other embodiments, the logging tool 208 communicates with only one of the controllers 202, 204 and 206.

Figure 3:
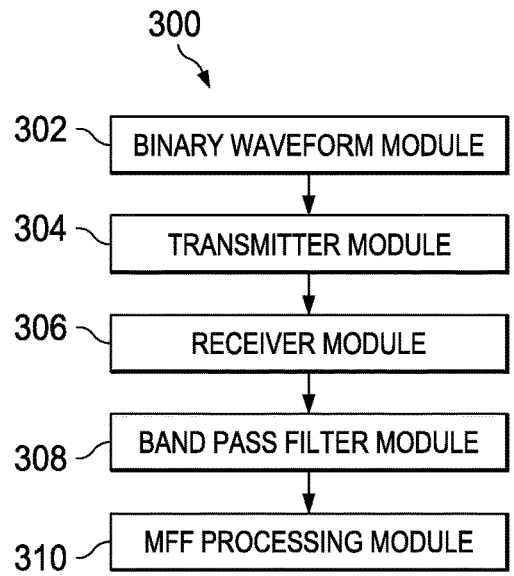
FIG. 3 is a block diagram illustrating an example of a multi-frequency focusing signal processing system.

FIG. 3 is a block diagram illustrating an example of a MFF signal processing system 300. The MFF signal processing system 300 includes a binary waveform module 302, a transmitter module 304, a receiver module 306, a band pass filter module 308, and a MFF processing module 310.

In some embodiments, the binary waveform module 302 is stored on the controllers 202, 204, and 206. In other embodiments, the binary waveform module 302 is stored on the server 212. The binary waveform module 302 is configured to obtain an input for a harmonic frequency set to evaluate resistivity of a formation, to select a waveform from a library of waveforms suitable for generating a signal to evaluate the resistivity of the formation, and to generate a binary waveform based on the selected waveform. Various embodiments of the binary waveform module are described in further detail in the paragraphs below. The generated binary waveform is transmitted, via a telemeter component, from a surface location to the logging tool 208. In some embodiments, the telemeter component may be a component of the controller 202, 204, or 206. In other embodiments, the telemeter component may be a component of a standalone electronic system that is located proximate to the controller 202, 204, and 206. Similarly, the logging tool may also include a telemeter component configured to receive the generated waveform at the location of the logging tool 208. In other embodiments, the telemeter component may include additional components to function as transceivers that are configured to transmit and to receive signals at their respective locations.

The generated binary waveform is provided to the transmitter module 304. The transmitter module 304 is located on the logging tool 208 and includes multiple transmitter coils, which are configured to transmit signals corresponding to the binary waveform to induce a corresponding current in the surrounding formation. The induced current in turn induces a secondary magnetic field, which is detected or received by receiver coils of the receiver module 306. In some embodiments, the receiver module 306 is co-located with the transmitter module 304, and together with the transmitter module 304 are components of the logging tool 208. The receiver module 306 is also configured to provide the signals corresponding to the received binary waveform to the band pass filter module 308.

The band pass filter module 308 is configured to filter signals corresponding to the received binary waveform for each harmonic frequency of the inputted harmonic frequency set. In some embodiments, the band pass filter module 308 includes at least one quadrature detection band pass digital filter and is configured to filter the received binary waveform for magnetic field components at each harmonic frequency of the inputted harmonic frequency set.

In such embodiments the at least one quadrature detection band pass digital filter is also configured to calibrate, based on one or more calibration factors, the filtered harmonic frequency set to determine apparent conductivities at each harmonic frequency of the harmonic frequency set. The at least one quadrature detection band pass digital filter is further configured to convert, based on the one or more calibration factors, the filtered harmonic frequency set into apparent conductivities at each filtered harmonic frequency of the harmonic frequency set. The band pass filter module 308 may also be configured to provide the determined apparent conductivities to the MFF processing module 310.

The MFF processing module 310, upon receipt of the apparent conductivities, is configured to calculate the resistivity of the formation at the wellbore location based on the received apparent conductivities at each harmonic frequency of the harmonic frequency set. In some embodiments, the MFF processing module 310 is configured to utilize one or more algorithms to calculate the formation resistivity. The calculated formation resistivity may be stored in a storage component of the logging tool 208 or may be transmitted to the controllers 202, 204, and/or 206 via a telemeter, such as the telemeter component of the logging tool 208.

Various factors, including, but not limited to, distance between the transmitter coils of the transmitter module 304 and the receiver coils of the receiver module 306 (coil spacing), and conductivity of the borehole, affect the signal strength of the received binary waveform relative to the signal strength of transmitted binary waveform. In particular, signals corresponding to high harmonic frequencies are more attenuated relative to signals corresponding to lower harmonic frequencies. Signals corresponding to high harmonic frequencies are also more attenuated when traveling through highly conductive formations. The attenuation of signals corresponding to a transmitted binary waveform having high harmonic frequencies reduces the accuracy of calculations by the MFF processing module 310. As such, the binary waveform generation module 302 may take into account the expected conductivity of the borehole when selecting a waveform to evaluate the formation resistivity at the location of the logging tool 208.

Figure 4:
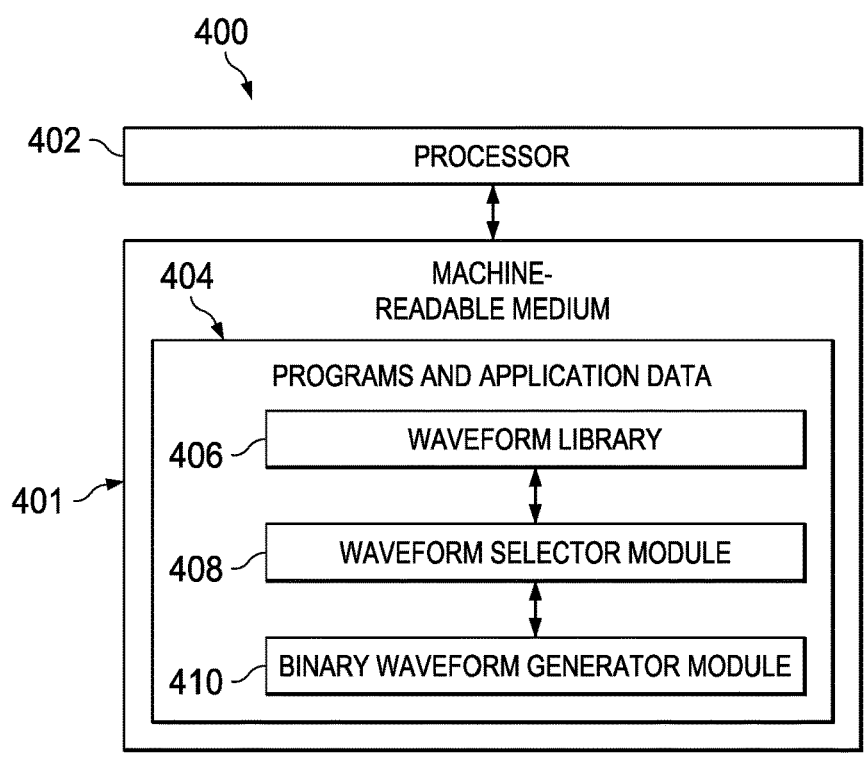
FIG. 4 is a block diagram illustrating an example of a waveform generation system that performs the functions of a binary waveform module as referenced in FIG. 3.

FIG. 4 is a block diagram illustrating an example of a waveform generation system 400 that performs the functions of the binary waveform module 302, as referenced in FIG. 3. The waveform generation system 400 includes machine-readable medium 401, which includes programs and application data 404 such as waveform library 406, waveform selector module 408, and binary waveform generator module 410. The waveform library 406 includes various pre-designed waveforms having different frequency spectrums of waveforms, such as, but not limited to, a square waveform, a Cox Waveform, and a waveform illustrated in FIGS. 6A and 6B. Each waveform spectrum of the waveform spectrums stored in the waveform library 406 includes a fundamental frequency and various harmonic frequencies of the respective waveform spectrum. In some embodiments, the waveform library 406 includes waveform spectrums having different fundamental frequencies. The waveform library 406 may be augmented to include new waveform spectrums that are tailored to evaluate a specific type of formation. Waveform spectrums stored within the waveform library 406 may also be modified to improve future formation resistivity calculations.

The waveform generation system 400 also includes processor 402. The processor 402 is configured to execute instructions stored in the machine-readable medium 401 to perform operations such as, but not limited to, (a) selecting, from the waveform library 406, a waveform suitable for generating a signal to evaluate formation resistivity, and (b) generating, via the binary waveform generator module 410, a binary waveform for transmission to evaluate the formation resistivity. The processor 402 may also be configured to provide the generated waveform to the logging tool 208.

The waveform generation system 400 is configured to obtain a set of harmonic frequencies for use in evaluating a formation resistivity. In some embodiments, the set of harmonic frequencies is obtained from a user input. In one of such embodiments, the processor 402 is configured to operate the waveform selector module 408 to filter the waveform library 406 to identify a waveform spectrum having a substantially highest SNR ratio for each harmonic frequency of the set of harmonic frequencies. In other embodiments, the processor 402 is configured to operate the waveform selector module 408 to filter the waveform library 406 for a waveform spectrum having a substantially highest amplitude for a specific harmonic frequency (e.g., the fifth harmonic frequency) of harmonic frequency set. In further embodiments, the processor 402 is configured to operate the waveform selector module 408 to filter the waveform library 406 for a waveform spectrum having a substantially highest amplitude for a range of harmonic frequencies (e.g., for the fifth to the ninth harmonic frequencies) within the harmonic frequency set. As used herein, a "substantially highest SNR ratio" is defined to include the highest SNR ratio for a harmonic frequency relative SNR ratios of other waveforms for the harmonic frequency. As used herein, a "substantially highest amplitude" is defined to include the highest amplitude for a harmonic frequency relative to amplitudes of other waveforms for the harmonic frequency. In some embodiments, the processor 402 is configured to operate the waveform selector module 408 to filter the waveform library 406 for a waveform having a SNR ratio for each harmonic frequency of the harmonic frequency set that is higher than a SNR threshold, and having an amplitude for each harmonic frequency of the harmonic frequency set that is higher than an amplitude threshold.

In some embodiments, the waveform generation system 400 may be configured to dynamically determine a set of harmonic frequencies for evaluating the formation resistivity. In such embodiments, the processor 402 filters a log of nearby formations stored in the machine-readable medium 401 to determine a resistivity of another formation proximate to the formation at issue and to determine the harmonic frequency set to evaluate the proximate formation. The processor 402 then operates the waveform selector module 408 to filter the waveform library 406 for a waveform spectrum based on the harmonic frequency set to evaluate the proximate formation. In further embodiments, the waveform generation system 400, upon receipt of a formation resistivity at the wellbore location as calculated by the MFF module 310, may be configured to dynamically perform a subsequent evaluation of the resistivity at the wellbore location. In such embodiments, the waveform generation system 400 may dynamically determine the set of harmonic frequencies for evaluating the formation resistivity based on the calculated formation resistivity. In further embodiments, the waveform generation system 400, upon receipt of a formation resistivity at the wellbore location as calculated by the MFF module 310, may be configured to obtain, based on the calculated formation resistivity, a second harmonic frequency set to generate a waveform for evaluating a resistivity of a formation proximate to the wellbore location. The waveform generation system 400 may further calculate the resistivity of the formation proximate to wellbore location from signals corresponding to a waveform that includes the second harmonic frequency set.

In some embodiments, the binary waveform module 302 includes the waveform library 406, the waveform selector module 408, and the binary waveform generator module 410. In some embodiments, the waveform generation system 400 resides on one or more of the controllers 202, 204, and/or 206. In other embodiments, the waveform generation system 400 resides on the server 212. In further embodiments, the waveform generator system 400 is formed by multiple communicatively connected electronic systems. In further embodiments, the waveform generator system 400 resides in the logging tool 208.

Figure 5A:
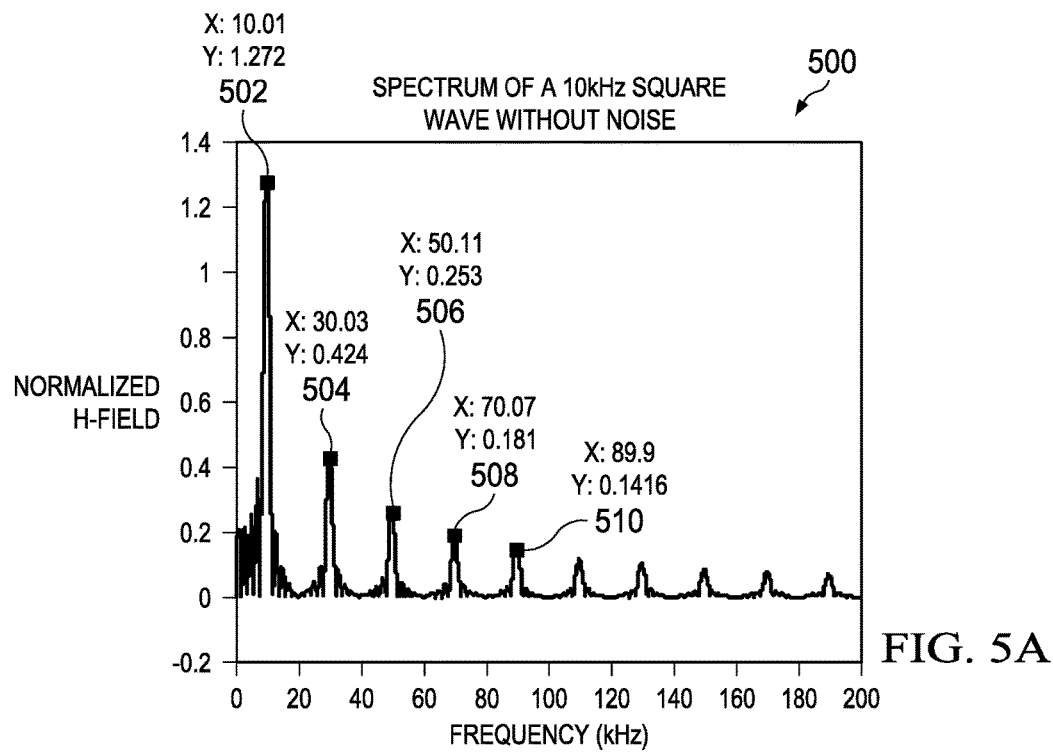
FIG. 5A is a line graph illustrating a spectrum of a 10 kHz square wave without noise.

FIG. 5A is a line graph 500 illustrating a spectrum of a 10 kHz square wave without noise. The spectrum of the square wave includes a fundamental frequency centered at peak 502, a third harmonic frequency centered at peak 504, a fifth harmonic frequency centered at peak 506, a seventh harmonic frequency centered at peak 508, a ninth harmonic frequency centered at peak 510, and additional harmonic frequencies.

Figure 5B:
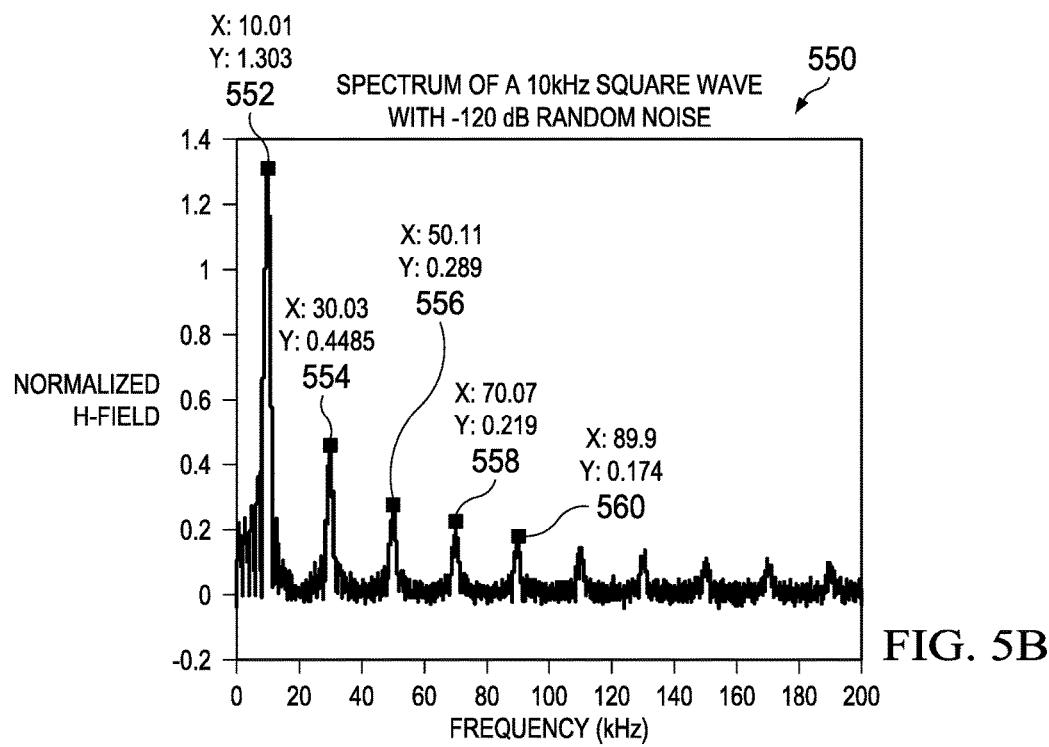
FIG. 5B is a line graph illustrating a spectrum of a 10 kHz square wave of FIG. 5A with −120 dB random noise.

FIG. 5B is a line graph 550 illustrating a spectrum of a 10 kHz square wave of FIG. 5A with −120 dB random noise. The spectrum of the square wave includes the fundamental frequency centered around peak 552, the third harmonic frequency centered around peak 554, the fifth harmonic frequency centered around peak 556, the seventh harmonic frequency centered around peak 558, the ninth harmonic frequency centered around peak 560, and additional harmonic frequencies. As a generated binary waveform travels down the borehole to the logging tool for transmission, the generated binary wave encounters various noise factors. As a result, the received waveform spectrum deviates from the transmitted waveform spectrum. This deviation is more apparent for higher harmonic frequencies of the waveform spectrum. Table 1 provides an estimation of errors in apparent conductivity caused by noise at different harmonic frequencies of a square wave.

TABLE 1

| Harmonic no. | 1 | 3 | 5 | 7 | 9 |
|---|---|---|---|---|---|
| F (kHz) | 10 | 30 | 50 | 70 | 90 |
| Error caused by noise (%) | 2.4 | 5.78 | 6.32 | 21.0 | 22.9 |

As illustrated in FIG. 5B and described in Table 1, while errors in apparent conductivity due to noise is relatively low for the first and third harmonic frequencies, the error rate dramatically increases at higher harmonic frequencies. As such, the square wave would be suitable for evaluating resistive formations, which may only need two or three harmonic frequencies, but would not be suitable for evaluating conductive formations, such as water based mud, which may need more harmonic frequencies.

Figure 6A:
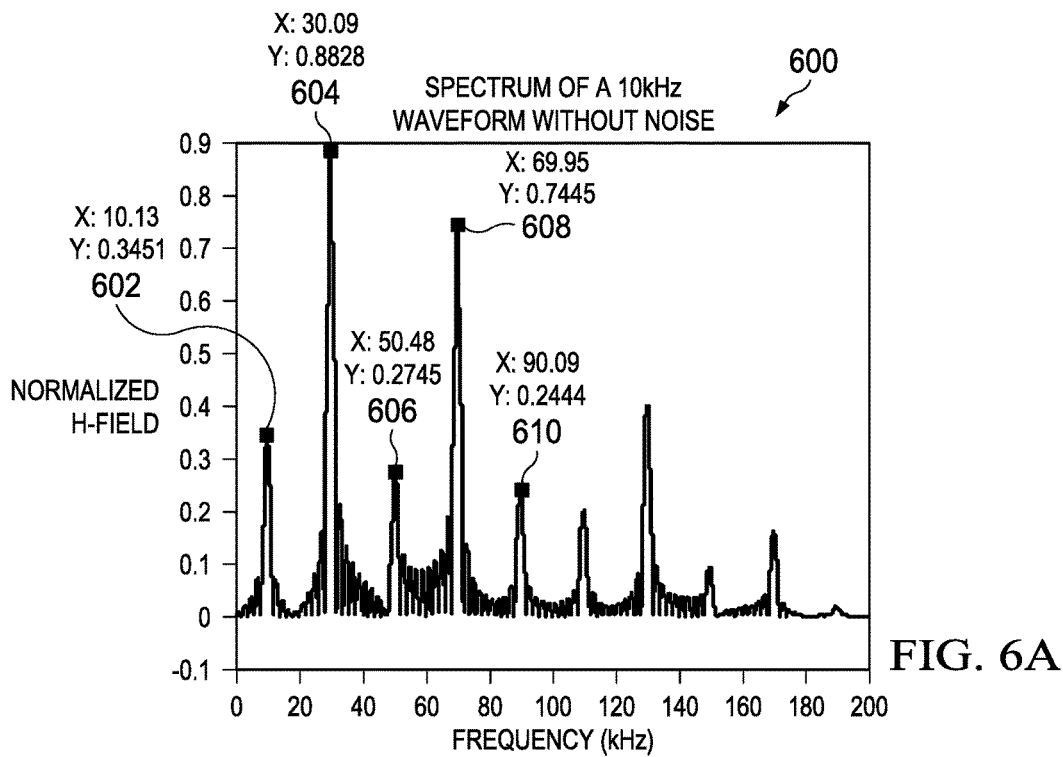
FIG. 6A is a line graph illustrating of a spectrum of an improved 10 kHz waveform with higher power distribution in higher harmonics without noise relative to a 10 kHz square waveform.

FIG. 6A is a line graph illustrating of an improved 10 kHz waveform with higher power distribution in higher harmonics without noise relative to a 10 kHz square wave. The spectrum of the waveform includes a fundamental frequency centered at peak 602, a third harmonic frequency centered at peak 604, a fifth harmonic frequency centered at peak 606, a seventh harmonic frequency centered at peak 608, a ninth harmonic frequency centered at peak 610, and additional harmonic frequencies.

Figure 6B:
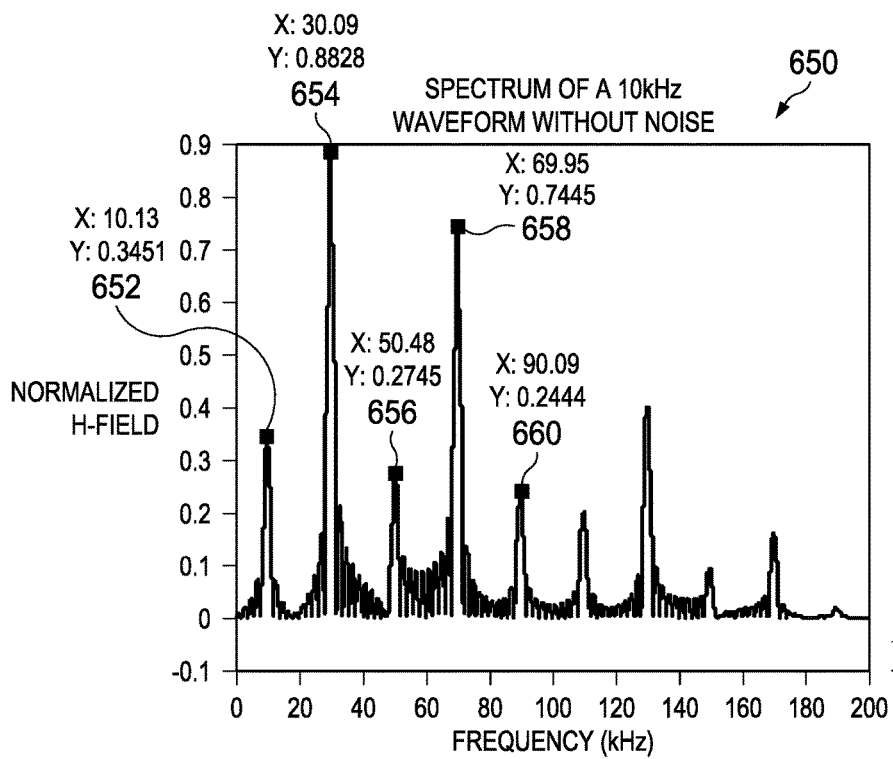
FIG. 6B is a line graph illustrating a spectrum of the improved waveform of FIG. 6A with −120 dB random noise.

FIG. 6B is a line graph illustrating a spectrum of the improved waveform of FIG. 6A with −120 dB random noise.

The spectrum of the square wave includes the fundamental frequency centered around peak 652, the third harmonic frequency centered around peak 654, the fifth harmonic frequency centered around peak 656, the seventh harmonic frequency centered around peak 658, the ninth harmonic frequency centered around peak 660, and additional harmonic frequencies. The waveform illustrated in FIGS. 6A and 6B have higher peak amplitudes and higher SNRs at higher harmonic frequencies relative to the peak amplitudes and SNRs of a 10 kHz square wave at corresponding harmonic frequencies. Table 2 provides an estimation of errors in apparent conductivity caused by noise at different harmonic frequencies of the waveform illustrated in FIGS. 6A and 6B.

TABLE 2

| Harmonic no. | 1 | 3 | 5 | 7 | 9 |
| --- | --- | --- | --- | --- | --- |
| F (kHz) | 10 | 30 | 50 | 70 | 90 |
| Error caused by noise (%) | 4.9 | 1.04 | 2.8 | 2.7 | 5.0 |

As illustrated in FIG. 6B and described in Table 2, errors in apparent conductivity using the fifth, the seventh, and the ninth harmonics are significantly less relative to the square wave. As such, the waveform illustrated in FIGS. 6A and 6B would be more suitable for evaluating resistivity of a formation having high conductivity, such as water based mud. Therefore, the waveform illustrated in FIGS. 6A and 6B may be selected from the waveform library to evaluate resistivity of a highly conductive formation, such as a water based mud.

Figure 7:
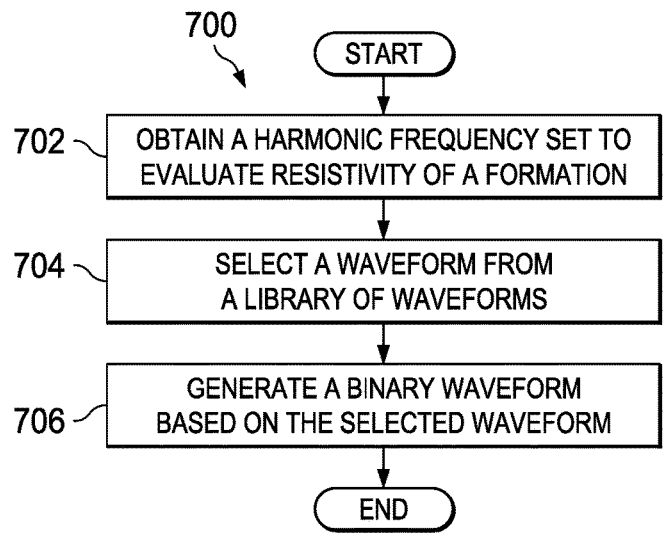
FIG. 7 is a flow chart illustrating a process for generating a waveform for multi-frequency focusing processing.

FIG. 7 is a flow chart illustrating a process 700 for generating a waveform for MFF processing. The paragraphs below describe the operations of process 700 being performed by the controller 202 and by logging tool 208 illustrated in FIG. 2. Although the controller 202 is illustrated in FIG. 2 as a desktop computer, the process 700 may be performed by other types of controllers such as, but not limited to, laptop computers, tablet computers, smartphones, PDAs, and by similar logging tools described herein. Although operations in process 700 are shown in a particular order, certain operations may be performed in different orders or at the same time where feasible.

At step 702 the controller 202 obtains a harmonic frequency set for evaluating a resistivity of a formation at the location of the logging tool 208, where the obtained harmonic frequency set includes at least one harmonic frequency of a fundamental frequency. At step 704, the controller 202 selects a waveform from a library of waveforms based on the obtained harmonic frequency set. The library of waveforms may be stored locally or stored remotely in data store 214 and includes multiple waveforms having different frequency spectrums. The selected waveform corresponds to a predicted conductivity of the formation. At step 706, the controller 202 generates, based on the selected waveform, a binary waveform for evaluating the resistivity of the formation at the location of the logging tool 208.

In some embodiments, the controller 202 obtains the harmonic frequency set via a user input. In other embodiments, the controller 202 dynamically obtains the harmonic frequency set for evaluating the resistivity of the formation at the location of the logging tool 208. In one of such embodiments, the controller 202 accesses a log of formation resistivity proximate to the location of the logging tool to obtain an estimated formation resistivity at the proximate location. The controller 202 then obtains a harmonic frequency set based on the estimated formation resistivity at the proximate location. The controller 202 then selects a waveform based on the obtained harmonic set.

The generated binary waveform is transmitted from the controller 202 to the logging tool 208 via one or more communications components and methods discussed in the foregoing paragraphs. In some embodiments, the binary waveform is provided to a transmitter unit of the logging tool having transmitter coils. The transmitter unit transmits the binary waveform to induce a current in the surrounding formation, which in turn induces a secondary magnetic field. The induced secondary magnetic field is received by receiver coils of a receiver unit of the logging tool 208. The receiver unit provides the received binary waveform to a set of quadrature detection and band pass filter component of the logging tool 208 to filter the received binary waveform for magnetic field components at each harmonic frequency of the harmonic frequency set, and to convert, based on at least one calibration factor, the filtered magnetic field components to apparent conductivities at each harmonic frequency of the harmonic frequency set. The apparent conductivities at each harmonic frequency of the harmonic frequency set is then provided to the MFF processing component of the logging tool 208 to calculate the resistivity of the formation at the logging tool 208. Detailed descriptions of the band pass filter and the MFF components are provided in the foregoing paragraphs.

Figure 8:
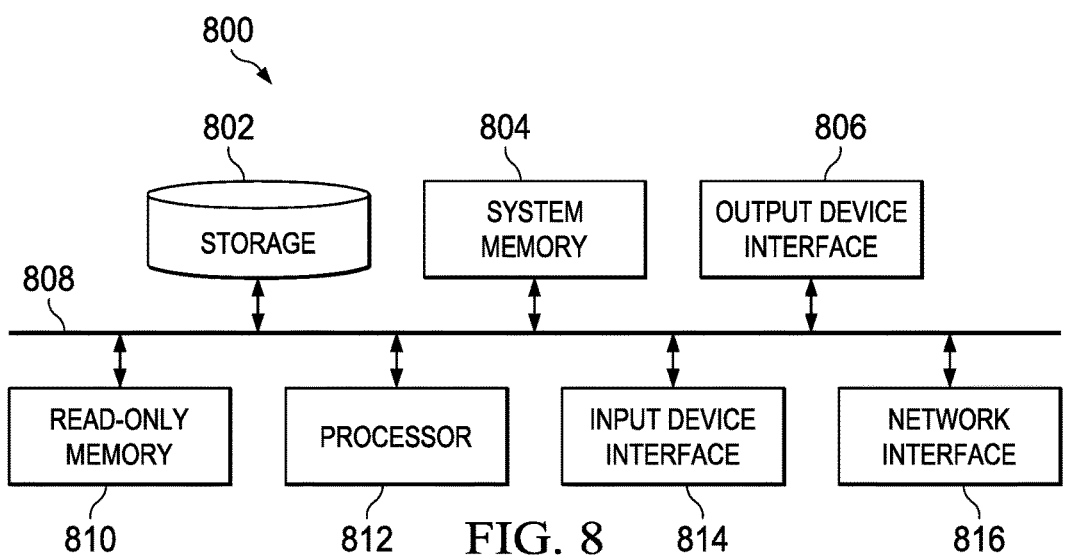
FIG. 8 is a diagram of an electronic system deployed in a wireline logging environment.

FIG. 8 is a diagram of an electronic system deployed in a wireline logging environment. In some embodiments, electronic system 800 represents the controllers 202, 204, and 206. The electronic system 800 can also represent the logging tool 208 or a similar logging tool configured to measure formation resistivity. Such an electronic system includes various types of computer readable media and interfaces for various other types of computer readable media. In the embodiment illustrated in FIG. 8, the electronic system 800 includes a bus 808, processing unit(s) 812, a system memory 804, a read-only memory (ROM) 810, a permanent storage device 802, an input device interface 814, an output device interface 806, and a network interface 816.

The bus 808 collectively represents all system, peripheral, and chipset buses that communicatively connect the numerous internal devices of the electronic system 800. For instance, the bus 808 communicatively connects the processing unit(s) 812 with the ROM 810, the system memory 804, and the permanent storage device 802.

From these various memory units, the processing unit(s) 812 retrieves instructions to execute and data to process in order to execute the processes of the subject disclosure. The processing unit(s) can be a single processor or a multi-core processor in different implementations.

The ROM 810 stores static data and instructions that are needed by the processing unit(s) 812 and other modules of the electronic system. The permanent storage device 802, on the other hand, is a read-and-write memory device. This device is a non-volatile memory unit that stores instructions and data even when the electronic system 800 is off. Some implementations of the subject disclosure use a mass-storage device (such as a magnetic or optical disk and its corresponding disk drive) as the permanent storage device 802.

Other implementations use a removable storage device (such as a floppy disk, flash drive, and its corresponding disk drive) as the permanent storage device 802. Like the permanent storage device 802, the system memory 804 is a read-and-write memory device. However, unlike the storage device 802, the system memory 804 is a volatile read-andwrite memory, such a random access memory. The system memory 804 stores some of the instructions and data that the processor needs at runtime. In some implementations, the processes of the subject disclosure are stored in the system memory 804, the permanent storage device 802, and/or the ROM 810. From these various memory units, processing unit(s) 812 retrieves instructions to execute and data to process in order to execute the processes of some implementations.

The bus 808 also connects to the input and output device interfaces 814 and 806. The input device interface 814 enables the user to communicate information and select commands to the electronic system. Input devices used with the input device interface 814 may include, for example, alphanumeric keyboards and pointing devices (also called "cursor control devices"). The output device interfaces 806 enables, for example, the display of images generated by the electronic system 800. The output devices used with output device interface 806 include, for example, printers and display devices, such as cathode ray tubes (CRT) or liquid crystal displays (LCD). Some implementations include devices such as a touchscreen that functions as both input and output devices. In some embodiments, the logging tool 208 lacks the input and output device interfaces 814 and 806.

Finally, as shown in FIG. 8, the bus 808 also couples the electronic system 800 to a network (not shown) through the network interface 816. In this manner, the computer can be a part of a network of computers (such as a local area network ("LAN"), a wide area network ("WAN"), or an Intranet, or a network of networks, such as the Internet. Any or all components of the electronic system 800 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer, such as desktop computer 202 and laptop computer 204 having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

The present disclosure may also be understood as including at least the following clauses:

Clause 1: A computer-implemented method of determining the conductivity of a geological formation, the method comprising: obtaining a harmonic frequency set to evaluate a resistivity of a formation at a wellbore location, the harmonic frequency set comprising at least one harmonic frequency of a fundamental frequency; selecting a waveform from a library of waveforms based on the obtained harmonic frequency set, the library of waveforms comprising a plurality of waveforms having different frequency spectrums, and the selected waveform corresponding to a predicted conductivity of the formation; and generating, based on the selected waveform, a binary waveform for use in evaluating the resistivity of the formation at the wellbore location.

Clause 2: The computer-implemented method of clause 1, wherein selecting the waveform from the library of waveforms comprises selecting one waveform of the plurality of waveforms having a substantially highest signal to noise ratio for each harmonic frequency of the obtained harmonic frequency set.

Clause 3: The computer-implemented method of any of clauses 1 and 2, wherein obtaining the harmonic frequency set comprises obtaining an input corresponding to a number of harmonics of the fundamental frequency, and wherein selecting the waveform from the library of waveforms comprises selecting one waveform from the plurality of waveforms having a substantially highest signal to noise ratio for each harmonic less than or equal to the number of harmonics.

Clause 4: The computer-implemented method of any of clauses 1-3, wherein selecting the waveform from the library of waveforms comprises selecting one waveform of the plurality of waveforms having a substantially highest amplitude for each harmonic frequency of the obtained harmonic frequency set.

Clause 5: The computer-implemented method of any of clauses 1-4, wherein selecting the waveform from the library of waveforms comprises selecting one waveform having a signal to noise ratio higher than a signal to noise ratio threshold for each harmonic frequency of the harmonic frequency set, and having an amplitude for each harmonic frequency of the harmonic frequency set higher than an amplitude threshold.

Clause 6: The computer-implemented method of any of clauses 1-5, further comprising: providing the generated binary waveform to a transmitter component of a logging tool at the well bore location for transmission of the generated binary waveform; and transmitting, via the transmitter component of the logging tool, a binary waveform to a receiver component of the logging tool, the receiver component being co-located with the transmitted component and located at the wellbore location.

Clause 7: The computer-implemented method of any of clauses 1-6, further comprising: providing the received binary waveform to a set of quadrature detection band pass digital filters; and filtering the received binary waveform for a waveform comprising the harmonic frequency set to calculate the resistivity of the formation at the wellbore location.

Clause 8: The computer-implemented method of any of clauses 1-6, further comprising: providing the received binary waveform to a set of quadrature detection band pass digital filters; filtering the received binary waveform for magnetic field components at each harmonic frequency of the harmonic frequency set; converting, by a calibration factor, the magnetic field components at each harmonic frequency to apparent conductivities at each harmonic frequency of the harmonic frequency set; and calculating the resistivity of the formation at the wellbore location based on the apparent conductivities at each harmonic frequency of the harmonic frequency set.

Clause 9: The computer-implemented method of any of clauses 1-8, further comprising: obtaining, based on the resistivity of the formation at the wellbore location, a second harmonic frequency set to evaluate a resistivity of a formation at a wellbore location proximate to the wellbore location; and calculating the resistivity of the formation at the wellbore location proximate to the wellbore location based on the second harmonic frequency set.

Clause 10: The computer-implemented method of any of clauses 1-9, further comprising: obtaining a calculated resistivity of a formation proximate to the wellbore location; and dynamically determining the harmonic frequency set for evaluating the resistivity of the formation at the wellbore location based on the calculated resistivity of the formation proximate to the wellbore formation, wherein the obtained harmonic frequency set for evaluating the resistivity of the formation at the wellbore location is the dynamically determined harmonic frequency set.

Clause 11: The computer-implemented method of any of clauses 1-10, further comprising receiving a user input for the harmonic frequency set, and wherein the obtained harmonic frequency set for evaluating the resistivity of the formation at the wellbore location is the user input for the harmonic frequency set.

Clause 12: The computer-implemented method of any of clauses 1-11, further comprising: receiving a user input corresponding to an additional waveform, the additional waveform having a plurality of harmonic frequencies of the fundamental frequency; and augmenting the library of waveforms to include the additional waveform.

Clause 13: A machine-readable medium comprising instructions stored therein, for execution by one or more processors, cause a logging system to perform the steps of: obtaining a harmonic frequency set to generate a signal to evaluate a resistivity of a formation at a wellbore location, the harmonic frequency set comprising at least one harmonic frequency of a fundamental frequency; selecting a waveform from a library of waveforms based on the obtained harmonic frequency set, the library of waveforms comprising a plurality of waveforms having different frequency spectrums, and the selected waveform corresponding to a predicted conductivity of the formation; generating, based on the selected waveform, a binary waveform for use in evaluating the resistivity of the formation at the wellbore location; and providing the generated binary waveform to a transmitter component of a logging tool at the wellbore location for transmission of the generated binary waveform.

Clause 14: The machine-readable medium of clause 13, wherein selecting the waveform from the library of waveforms comprises selecting, by the one or more processors, one waveform of the plurality of waveforms having a substantially highest signal to noise ratio and a substantially highest amplitude for each harmonic frequency of the obtained harmonic frequency set.

Clause 15: The machine-readable medium of any of clauses 13 and 14, wherein selecting the waveform from the library of waveforms comprises selecting, by the one or more processors, one waveform having a signal to noise ratio higher than a signal to noise ratio threshold for each harmonic frequency of the obtained harmonic frequency set, and having an amplitude for the each harmonic frequency of the harmonic frequency set higher than an amplitude threshold.

Clause 16: The machine-readable medium of any of clauses 13-15, wherein obtaining the harmonic frequency and comprises obtaining, by the one or more processors, a user input for the harmonic frequency set to evaluate the resistivity of the formation at the wellbore location.

Clause 17: The machine-readable medium of any of clauses 13-16, wherein the instructions when executed by the one or more processors, cause the one or more processors to perform operations comprising: obtaining a calculated resistivity of a formation proximate to the wellbore location; and dynamically determining the harmonic frequency set to evaluate the resistivity of the formation at the wellbore formation based on the obtained resistivity of the formation proximate to the wellbore formation, wherein the obtained harmonic frequency set for evaluating the resistivity of the formation at the wellbore location is the dynamically determined harmonic frequency set.

Clause 18: A wellbore logging system, comprising: a binary waveform module operable to: obtain a harmonic frequency set to evaluate a resistivity of a formation at a wellbore location, the harmonic frequency set comprising at least one harmonic frequency of a fundamental frequency; select a waveform from a library of waveforms based on the obtained harmonic frequency set, the library of waveforms comprising a plurality of waveforms having different frequency spectrums, and the waveform corresponding to a predicted conductivity of the formation; and generate, based on the selected waveform, a binary waveform for use in evaluating the resistivity of the formation at the wellbore location; a transmitter module of a logging tool having at least one transmitter coil, the transmitter module located at the wellbore location and operable to transmit the generated waveform via the at least one transmitter coil; a receiver module of the logging tool having at least one receiver coil, the receiver module located at the wellbore location and being co-located with the transmitter module, the receiver module being operable to receive, via the at least one receiver coil, a waveform the transmitter module, the received waveform corresponding to the generated waveform; at least one quadrature detection band pass digital filter module operable to: filter the received waveform for magnetic field components at each harmonic frequency of the harmonic frequency set; and convert, based on at least one calibration factor, the filtered magnetic field components to apparent conductivities at each harmonic frequency of the harmonic frequency set; and a MFF processing module operable to calculate the resistivity of the formation at the wellbore location based on the apparent conductivities at each harmonic frequency of the harmonic frequency set.

Clause 19: The system of clause 18, wherein the binary waveform module is further operable to selecting one waveform of the plurality of waveforms having a substantially highest signal to noise ratio for each harmonic frequency of the obtained harmonic frequency set.

Clause 20: The system of any of clauses 18 and 19, wherein the binary waveform module, the at least one quadrature detection band pass digital filter module, and the MFF processing module are components of a controller located at a surface location, and wherein the transmitter module and the receiver module are components of the logging tool.

What is claimed is:

1. A computer-implemented method of determining the conductivity of a geological formation, the method comprising:
    obtaining a harmonic frequency set to evaluate a resistivity of a formation at a wellbore location, the harmonic frequency set comprising at least one harmonic frequency of a fundamental frequency;
    selecting a waveform from a library of waveforms based on the obtained harmonic frequency set, the library of waveforms comprising a plurality of waveforms having different frequency spectrums, and the selected waveform corresponding to a predicted conductivity of the formation; and
    generating, based on the selected waveform, a binary waveform for use in evaluating the resistivity of the formation at the wellbore location.

2. The computer-implemented method of claim 1, wherein selecting the waveform from the library of waveforms comprises selecting one waveform of the plurality of waveforms having a substantially highest signal to noise ratio for each harmonic frequency of the obtained harmonic frequency set.

3. The computer-implemented method of claim 1, wherein obtaining the harmonic frequency set comprises obtaining an input corresponding to a number of harmonics of the fundamental frequency, and
    wherein selecting the waveform from the library of waveforms comprises selecting one waveform from the plurality of waveforms having a substantially highest signal to noise ratio for each harmonic less than or equal to the number of harmonics.

4. The computer-implemented method of claim 1, wherein selecting the waveform from the library of waveforms comprises selecting one waveform of the plurality of waveforms having a substantially highest amplitude for each harmonic frequency of the obtained harmonic frequency set.

5. The computer-implemented method of claim 1, wherein selecting the waveform from the library of waveforms comprises selecting one waveform having a signal to noise ratio higher than a signal to noise ratio threshold for each harmonic frequency of the harmonic frequency set, and having an amplitude for each harmonic frequency of the harmonic frequency set higher than an amplitude threshold.

6. The computer-implemented method of claim 1, further comprising:
    providing the generated binary waveform to a transmitter component of a logging tool at the well bore location for transmission of the generated binary waveform; and
    transmitting, via the transmitter component of the logging tool, a binary waveform to a receiver component of the logging tool, the receiver component being co-located with the transmitted component and located at the wellbore location.

7. The computer-implemented method of claim 6, further comprising:
    providing the received binary waveform to a set of quadrature detection band pass digital filters; and
    filtering the received binary waveform for a waveform comprising the harmonic frequency set to calculate the resistivity of the formation at the wellbore location.

8. The computer-implemented method of claim 6, further comprising:
    providing the received binary waveform to a set of quadrature detection band pass digital filters;

filtering the received binary waveform for magnetic field components at each harmonic frequency of the harmonic frequency set;

converting, by a calibration factor, the magnetic field components at each harmonic frequency to apparent conductivities at each harmonic frequency of the harmonic frequency set; and calculating the resistivity of the formation at the wellbore location based on the apparent conductivities at each harmonic frequency of the harmonic frequency set.

9. The computer-implemented method of claim 8, further comprising:

obtaining, based on the resistivity of the formation at the wellbore location, a second harmonic frequency set to evaluate a resistivity of a formation at a wellbore location proximate to the wellbore location; and calculating the resistivity of the formation at the wellbore location proximate to the wellbore location based on the second harmonic frequency set.

10. The computer-implemented method of claim 1, further comprising:

obtaining a calculated resistivity of a formation proximate to the wellbore location; and dynamically determining the harmonic frequency set for evaluating the resistivity of the formation at the wellbore location based on the calculated resistivity of the formation proximate to the wellbore formation, wherein the obtained harmonic frequency set for evaluating the resistivity of the formation at the wellbore location is the dynamically determined harmonic frequency set.

11. The computer-implemented method of claim 1, further comprising receiving a user input for the harmonic frequency set, and wherein the obtained harmonic frequency set for evaluating the resistivity of the formation at the wellbore location is the user input for the harmonic frequency set.

12. The computer-implemented method of claim 1, further comprising:

receiving a user input corresponding to an additional waveform, the additional waveform having a plurality of harmonic frequencies of the fundamental frequency; and augmenting the library of waveforms to include the additional waveform.

13. A machine-readable medium comprising instructions stored therein, for execution by one or more processors, cause a logging system to perform the steps of:

obtaining a harmonic frequency set to generate a signal to evaluate a resistivity of a formation at a wellbore location, the harmonic frequency set comprising at least one harmonic frequency of a fundamental frequency;

selecting a waveform from a library of waveforms based on the obtained harmonic frequency set, the library of waveforms comprising a plurality of waveforms having different frequency spectrums, and the selected waveform corresponding to a predicted conductivity of the formation;

generating, based on the selected waveform, a binary waveform for use in evaluating the resistivity of the formation at the wellbore location; and providing the generated binary waveform to a transmitter component of a logging tool at the wellbore location for transmission of the generated binary waveform.

14. The machine-readable medium of claim 13, wherein selecting the waveform from the library of waveforms comprises selecting, by the one or more processors, one waveform of the plurality of waveforms having a substantially highest signal to noise ratio and a substantially highest amplitude for each harmonic frequency of the obtained harmonic frequency set.

15. The machine-readable medium of claim 13, wherein selecting the waveform from the library of waveforms comprises selecting, by the one or more processors, one waveform having a signal to noise ratio higher than a signal to noise ratio threshold for each harmonic frequency of the obtained harmonic frequency set, and having an amplitude for the each harmonic frequency of the harmonic frequency set higher than an amplitude threshold.

16. The machine-readable medium of claim 13, wherein obtaining the harmonic frequency and comprises obtaining, by the one or more processors, a user input for the harmonic frequency set to evaluate the resistivity of the formation at the wellbore location.

17. The machine-readable medium of claim 13, wherein the instructions when executed by the one or more processors, cause the one or more processors to perform operations comprising:

obtaining a calculated resistivity of a formation proximate to the wellbore location; and dynamically determining the harmonic frequency set to evaluate the resistivity of the formation at the wellbore formation based on the obtained resistivity of the formation proximate to the wellbore formation, wherein the obtained harmonic frequency set for evaluating the resistivity of the formation at the wellbore location is the dynamically determined harmonic frequency set.

18. A wellbore logging system, comprising:

a binary waveform module operable to:

obtain a harmonic frequency set to evaluate a resistivity of a formation at a wellbore location, the harmonic frequency set comprising at least one harmonic frequency of a fundamental frequency;

select a waveform from a library of waveforms based on the obtained harmonic frequency set, the library of waveforms comprising a plurality of waveforms having different frequency spectrums, and the waveform corresponding to a predicted conductivity of the formation; and generate, based on the selected waveform, a binary waveform for use in evaluating the resistivity of the formation at the wellbore location;

a transmitter module of a logging tool having at least one transmitter coil, the transmitter module located at the wellbore location and operable to transmit the generated waveform via the at least one transmitter coil;

a receiver module of the logging tool having at least one receiver coil, the receiver module located at the wellbore location and being co-located with the transmitter module, the receiver module being operable to receive, via the at least one receiver coil, a wavefrom the transmitter module, the received waveform corresponding to the generated waveform;

at least one quadrature detection band pass digital filter module operable to:

filter the received waveform for magnetic field components at each harmonic frequency of the harmonic frequency set; and convert, based on at least one calibration factor, the filtered magnetic field components to apparent conductivities at each harmonic frequency of the harmonic frequency set; and a MFF processing module operable to calculate the resistivity of the formation at the wellbore location based on the apparent conductivities at each harmonic frequency of the harmonic frequency set.

19. The system of claim 18, wherein the binary waveform module is further operable to selecting one waveform of the plurality of waveforms having a substantially highest signal to noise ratio for each harmonic frequency of the obtained harmonic frequency set.

20. The system of claim 18, wherein the binary waveform module, the at least one quadrature detection band pass digital filter module, and the MFF processing module are components of a controller located at a surface location, and wherein the transmitter module and the receiver module are components of the logging tool.

\* \* \* \* \*